US007751845B2

(12) United States Patent
Iwami

(10) Patent No.: US 7,751,845 B2
(45) Date of Patent: Jul. 6, 2010

(54) WIRELESS COMMUNICATION METHOD AND WIRELESS COMMUNICATION DEVICE

(75) Inventor: Masashi Iwami, Ogaki (JP)

(73) Assignee: Kyocera Corporation, Kyoto (JP)

( * ) Notice: Subject to any disclaimer, the term of this patent is extended or adjusted under 35 U.S.C. 154(b) by 775 days.

(21) Appl. No.: 11/526,817

(22) Filed: Sep. 26, 2006

(65) Prior Publication Data

US 2007/0149136 A1 Jun. 28, 2007

(30) Foreign Application Priority Data

Sep. 26, 2005 (JP) ............................ P2005-278462

(51) Int. Cl.
*H04B 7/00* (2006.01)
(52) U.S. Cl. .................... 455/522; 455/63.4; 455/562.1
(58) Field of Classification Search ................ 455/63.4, 455/522, 101, 127.1, 137, 561.1, 272, 273, 455/274
See application file for complete search history.

(56) References Cited

U.S. PATENT DOCUMENTS

| 2004/0165685 A1* | 8/2004 | Kitakado ..................... 375/343 |
| 2004/0192239 A1* | 9/2004 | Nakao et al. ................. 455/136 |

FOREIGN PATENT DOCUMENTS

| CN | 1287730 A | 3/2001 |
| CN | 1534894 A | 10/2004 |
| JP | 2000-332723 | 11/2000 |
| JP | 2002-50989 | 2/2002 |
| JP | 2002-176379 | 6/2002 |
| JP | 2003-124878 | 4/2003 |
| JP | 2004-153527 | 5/2004 |
| JP | 2004-266776 | 9/2004 |
| JP | 2004-297575 | 10/2004 |

OTHER PUBLICATIONS

Japanese Notice of Grounds for Rejection, w/ English translation thereof, issued in Patent Application No. JP 2005-278462 dated on Aug. 5, 2008.
Office Action with translation for CN 200610139354X, issued May 22, 2009.

* cited by examiner

*Primary Examiner*—Kamran Afshar
*Assistant Examiner*—Ezana Getachew
(74) *Attorney, Agent, or Firm*—Morrison & Foerster LLP

(57) ABSTRACT

An AA communication method using an AA communication device including a plurality of AA communication units includes: receiving a signal transmitted from a receiving terminal in each AA communication unit of UN-A and UN-BF, and measuring a receive level of the signal transmitted from the receiving terminal for each communication unit; calculating a transmit weight vector based on received signals corresponding to the signal transmitted from the receiving terminal for each AA communication unit; calculating a received power based on a measured value of the receive level and the transmit weight vector for each AA communication unit; comparing the received powers of the AA communication units, and, to match the received powers to the received power of the unit having a lowest received power, making a downward correction of an amplitude of the transmit weight vector for each of the other communication units; and transmitting a signal using the transmit weight vector after the correction by each communication unit.

7 Claims, 3 Drawing Sheets

WIRELESS COMMUNICATION METHOD AND WIRELESS COMMUNICATION DEVICE

CROSS REFERENCE TO RELATED APPLICATION

This application is based upon and claims the benefit of priority from prior Japanese Patent Application P2005-278462 filed on Sep. 26, 2005; the entire contents of which are incorporated by reference herein.

BACKGROUND OF THE INVENTION

1. Field of the Invention

The present invention relates to a wireless communication method and a wireless communication device.

2. Description of the Related Art

A receiver of a Personal Handyphone System (PHS system) as one example of a single-carrier communication system has the configuration shown in FIG. 1, and includes an antenna 101, a radio circuit 102, a local oscillator 103, an analog to digital (A/D) converter 104, and a digital demodulation circuit 105. The radio circuit 102 provided with a filter has a bandwidth of 300 kHz. The local oscillator 103 gives a signal having a frequency of f1. The A/D converter 104 performs an A/D conversion on a received baseband signal detected and extracted by the radio circuit 102. The digital demodulation circuit 105 demodulates the received digital signal converted by the A/D converter 104 to output an original transmitted signal with f1.

However, in the single-carrier communication system, the communication speed is slow, and is strongly desired to be increased. A communication system responding to increase in the communication speed is a multicarrier communication system. The multicarrier communication system is used as one scheme for increasing a communication speed in the field of wireless communication.

A description will be given of an example of a multicarrier communication system to which a PHS system is applied. In a PHS system, the width of one carrier is set 300 kHz (symbol rate is 192 kHz) because of standardization. To increase the communication speed with the width of one carrier maintained, there is basically no other way but employing multi-level transmission. For example, as a scheme for increasing the communication speed, the expansion of the carrier width (several megahertz in a $3^{rd}$ generation (3G) system) is effective. However, to achieve this, the standards need to be changed. In that case, such a system becomes totally different from a current PHS wireless device.

Accordingly, to widen the bandwidth with the standards maintained and increase the communication speed, a PHS receiver having the configuration of FIG. 2 is also conceived. The PHS receiver has a configuration in which receiving units R-UN1 and R-UN2 using two carriers are mounted. However, this is, so to speak, a configuration in which two single-carrier receivers shown in FIG. 1 are incorporated in one casing. In particular, the size of the casing is increased due to two channels of radio circuits 102 being mounted, and power consumption is also increased. Thus, this is unrealistic.

With the recent advancement in technology, even in the case where digital signal processing is very complicated, the load thereof can be made smaller in terms of size, power consumption, and the like compared to that of a radio frequency (RF) circuit, and demultiplexing is becoming capable by digital signal processing. Accordingly, as a multicarrier receiver which receives two carriers simultaneously, one having the configuration shown in FIG. 3 is realistic. This multicarrier receiver has a configuration in which the bandwidth is seemingly widened by mounting a radio circuit 102 having a filter with a width of 600 kHz that allows the passage of two adjacent signals each having a bandwidth of 300 kHz, and in which demultiplexing into signals each having a bandwidth of 300 kHz as heretofore is performed by digital signal processing using two channels of digital filters (DF) 106-1 and 106-2 and digital demodulation circuits 105-1 and 105-2 to increase the communication speed. In this patent application, a processing scheme in which the bandwidth of a radio circuit is widened and in which demultiplexing is performed by digital signal processing is referred to as multicarrier processing.

Here, multicarrier processing does not need to be performed at both a transmitter and a receiver. The transmitter needs only to have the function of transmitting a plurality of carriers. In an example of a PHS system, base stations are trending toward multichannelization and, in many cases, originally have the function of transmitting a plurality of carriers. Accordingly, a multicarrier communication system in which the communication speed is increased by utilizing a plurality of RFs of base stations can be realized by merely installing a multicarrier processing function on mobile terminals.

However, such multicarrier communication has the following technical problem to be solved. In the case where multicarrier communication is performed, if the difference between the levels of signals f1 and f2 is large, there are cases where demultiplexing cannot be appropriately performed by digital signal processing at the receiving end due to the problem of the dynamic range of an A/D converter. For example, a 10 dB difference between the levels of the received signals f1 and f2 corresponds to a 10-fold difference in power (3.16-fold difference in amplitude), and a 20 dB difference between the levels thereof corresponds to a 100-fold difference in power (10-fold difference in amplitude). In the case where the level difference is 20 dB and the A/D converter is 12 bits, a larger signal has a range of up to 2048, but a smaller signal has a range of merely up to 204. Thus, quantization error becomes large, and this can cause deterioration in reception performance.

SUMMARY OF THE INVENTION

The present invention has been accomplished in view of the above-described existing technical problems. An object of the present invention is to provide a wireless communication technology which can control a plurality of adaptive array (AA) transmit circuits or Omni transmit circuits at a base station side so that the received power of each carrier at a receiving terminal side becomes equal to each other and which enables a multicarrier receiver to perform stable reception.

A first aspect of the present invention is a wireless communication method using a wireless communication device having a plurality of communication units. The wireless communication method includes: receiving a signal transmitted from a receiving terminal in each communication unit, and measuring a receive level of the signal transmitted from the receiving terminal for each communication unit; calculating a transmit weight vector based on received signals corresponding to the signal transmitted from the receiving terminal for each communication unit; calculating a received power based on a measured value of the receive level and the transmit weight vector for each communication unit; comparing the received powers of the communication units, and, to match the received powers to the received power of the unit having a lowest received power, making a downward correction of an amplitude of the transmit weight vector for each of the other communication units; and transmitting a signal using the transmit weight vector after the correction by each communication unit.

A second aspect of the present invention is a wireless communication device having a plurality of adaptive array communication units. Each adaptive array communication unit includes a receive level meter for measuring a receive level of a received signal corresponding to a signal transmitted from a receiving terminal; a transmit weight vector calculator for calculating a transmit weight vector based on the received signals corresponding to the signal transmitted from the receiving terminal; a received power calculator for estimating a received power of the relevant unit based on a value of the receive level measured by the receive level meter and based on the transmit weight vector from the transmit weight vector calculator; and a transmit weight corrector for comparing the received power of the relevant unit, which is estimated by the received power calculator, with the received power estimated by another adaptive array communication unit, and if the received power of the relevant unit is higher, making a downward correction of an amplitude of the transmit weight vector so that the received power of the relevant unit matches with the received power of the unit having a lower received power.

A third aspect of the present invention is a wireless communication device having a plurality of communication units. Each communication unit includes a receive level meter for measuring a receive level of received signals corresponding to a signal transmitted from a receiving terminal; a transmit weight vector calculator for calculating a transmit weight vector based on the received signals corresponding to the signal transmitted from the receiving terminal; a received power calculator for estimating a received power of the relevant unit based on a value of the receive level measured by the receive level meter and based on the transmit weight vector from the transmit weight vector calculator; and a transmit weight corrector for comparing the received power of the relevant unit, which is estimated by the received power calculator, with the received power estimated by another communication unit, and if the received power of the relevant unit is higher, making a downward correction of an amplitude of the transmit weight vector so that the received power of the relevant unit matches with the received power of the unit having a lower received power.

According to the present invention, a plurality of communication units at a base station side are controlled so that the received power of each carrier at the receiving terminal side becomes equal to each other, thereby enabling a multicarrier receiver to perform stable reception. Thus, such a communication system is realized in which fast and reliable communication can be performed.

DETAILED DESCRIPTION OF THE INVENTION

Figure 1:
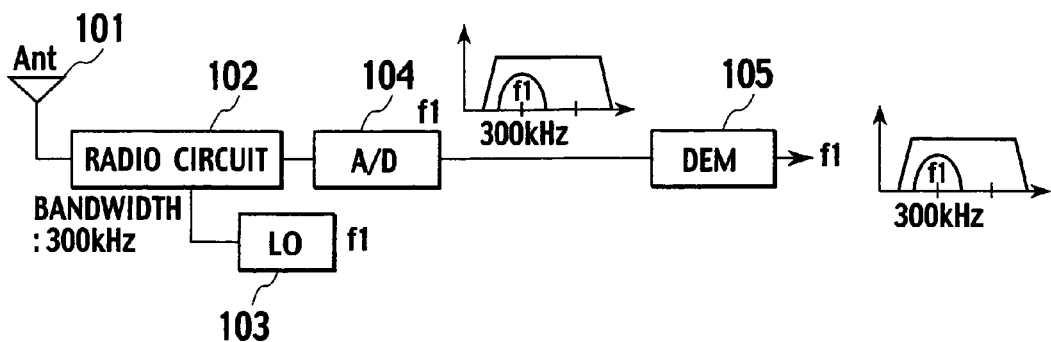
FIG. 1 is a block diagram of a conventional single-carrier receiver.
Figure 2:
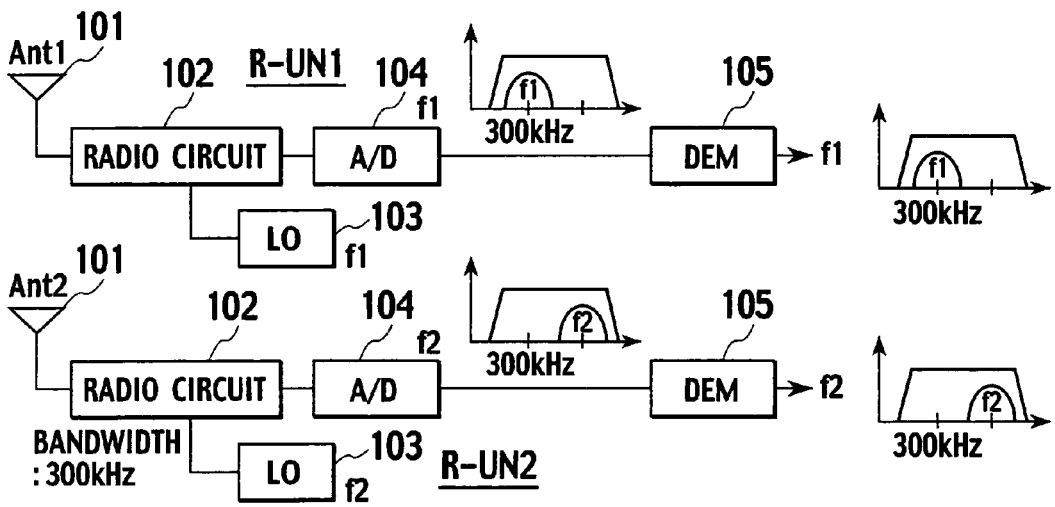
FIG. 2 is a block diagram of a conventional multicarrier receiver.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 4:
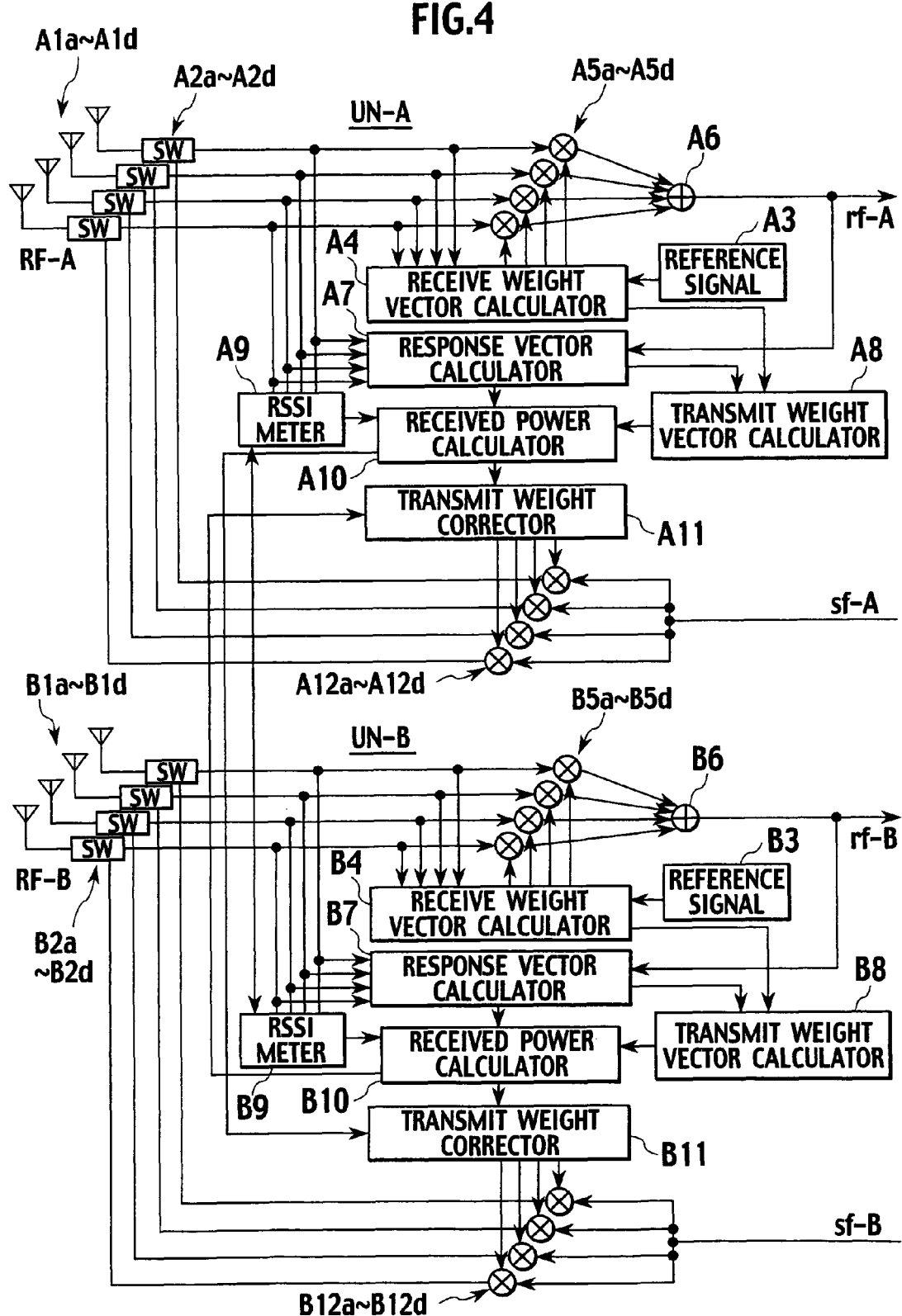
FIG. 4 is a block diagram of an adaptive array communication device according to an embodiment of the present invention.
Figure 5:
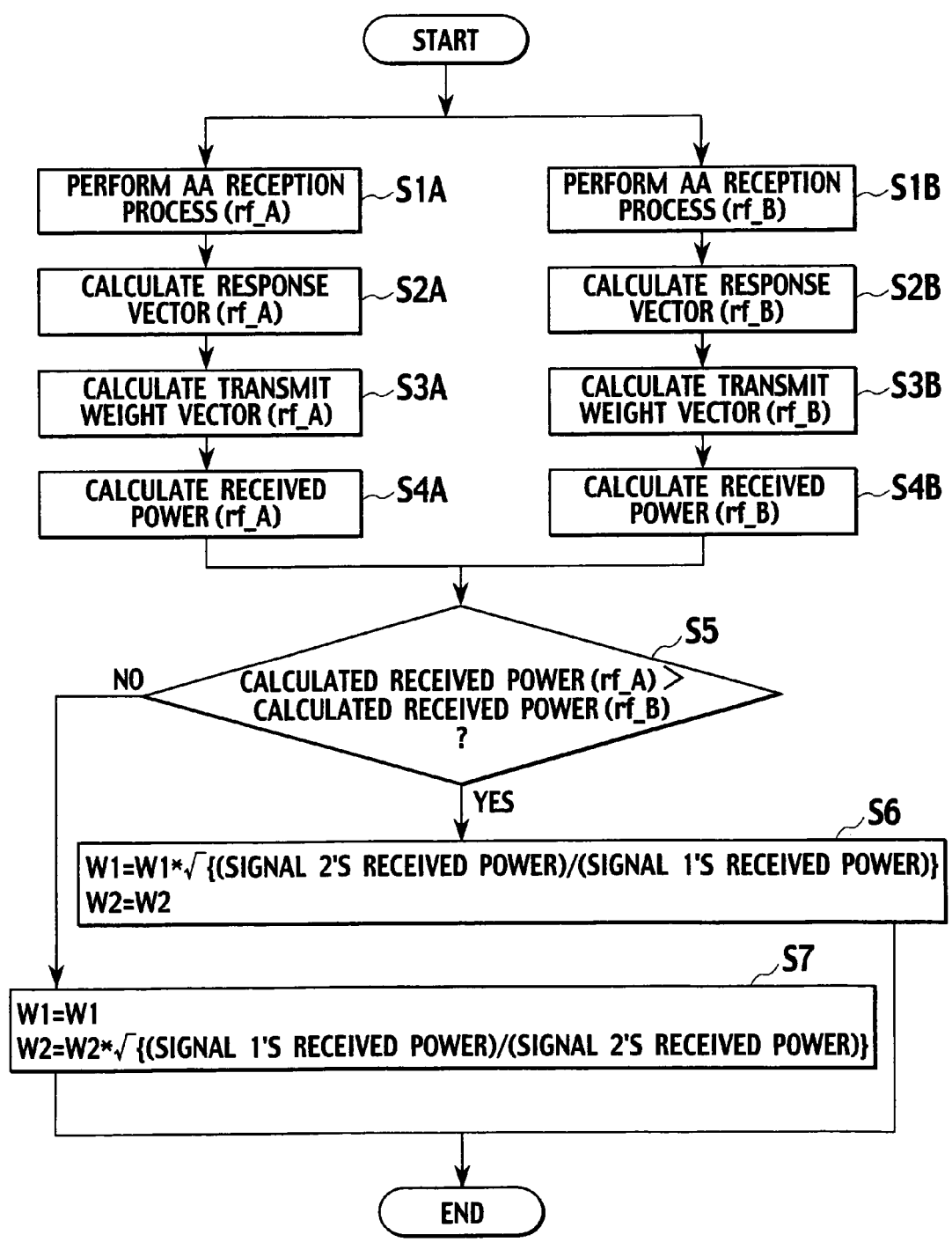
FIG. 5 is a flowchart of an adaptive array transmission process performed by the adaptive array communication device according to the embodiment.

FIG. 4 shows an adaptive array (AA) communication device according to an embodiment of the present invention, and FIG. 5 shows an AA transmission process performed by this AA communication device.

The AA communication device is designed to be installed in a PHS base station, and controls a plurality of AA communication units UN-A and UN-B so that the received powers of signals sf-A and sf-B transmitted by the AA communication units UN-A and UN-B become equal to each other at a receiving terminal side and that multicarrier processing can be stably performed at the receiving terminal side.

The AA communication unit UN-A which transmits and receives RF-A signals includes a plurality of antennas, four antennas A1$a$ to A1$d$ in this embodiment, switches (SW) A2$a$ to A2$d$, a receive weight vector calculator A4, multipliers A5$a$ to A5$d$, and an adder A6. The switches (SW) A2$a$ to A2$d$ transmit/receive mode switching. The receive weight vector calculator A4 calculates a receive weight vector using received digital signals that are signals received by the antennas A1$a$ to A1$d$ and converted into digital signals, and a reference signal A3 stored in a memory in advance. The multipliers A5$a$ to A5$d$ multiply the received digital signals by the receive weight vector calculated by this receive weight vector calculator A4. The adder A6 adds the results of the multiplications of the multipliers A5$a$ to A5$d$ together and outputs the resultant signal as a demodulated received signal rf-A. It should be noted that though only the antennas are shown as an RF section in FIG. 4, an RF section which converts radio signals received by the antennas A1$a$ to A1$d$ into baseband signals and further into received digital signals and, on the other hand, which converts digital signals to be transmitted into baseband analog signals and superimposes the analog signals on a carrier wave to transmit the resultant signals from the antennas A1$a$ to A1$d$, is shown as the antennas in a simplified manner.

The AA communication unit UN-A further includes a response vector calculator A7, a transmit weight vector calculator A8, an Received Signal Strength Indicator (RSSI) meter A9, a received power calculator A10, a transmit weight corrector A11, and multipliers A12$a$ to A12$d$. The response vector calculator A7 calculates a receive response vector using the received digital signals and the demodulated received signals rf-A. The transmit weight vector calculator A8 calculates a transmit weight vector using the receive weight vector calculated by the receive weight vector calculator A4 and the receive response vector calculated by the response vector calculator A7. The RSSI meter A9 measures a receive level based on the received digital signals. The received power calculator A10 calculates a received power from the transmit weight vector calculated by the transmit weight vector calculator A8 and the receive level measured by the RSSI meter A9. The transmit weight corrector A11 corrects transmit weights based on the received power calculation calculated by this received power calculator A10 and a received power calculation calculated by a received power calculator B10 of the other AA communication unit UN-B. The multipliers A12a to A12d multiply a transmit signal sf-A by the transmit weights corrected by this transmit weight corrector A11 and output to the antennas A1a to A1d the resultant digital signals to be transmitted.

The receive weight vector calculator A4 solves simultaneous equations using a generally known computation, e.g., a method disclosed in relation to a receive weight vector calculator of FIG. 1 of Japanese Unexamined Patent Publication No. 2002-50989 or a weight vector controlling section of FIG. 15 thereof, thus calculating weights so as for the total of coefficients of a signal of interest to sum up to one. Further, the response vector calculator A7 computes a receive response vector H1 by a calculation method mentioned in relation to a receive response vector calculator of FIG. 1 in the above-described publication. The transmit weight vector calculator A8 calculates a transmit weight vector W1 by a calculation method mentioned in relation to a transmit weight vector calculator of the above-described publication, using the receive weight vector calculated by the receive weight vector calculator A4 and the receive response vector H1 calculated by the response vector calculator A7.

The received power calculator A10 calculates the received power at the RF-A side using the receive response vector H1 calculated by the response vector calculator A7, the transmit weight vector W1 calculated by the transmit weight vector calculator A8, and the measured value RSSI of the RSSI meter A9. An equation for this calculation will be described later. The transmit weight corrector A11 corrects the amplitude of the transmit weight vector W1 calculated by the transmit weight vector calculator A8, using the received power at the RF-A side and an undermentioned received power at the RF-B side, and outputs the corrected transmit weight vector to the multipliers A12a to A12d.

The configuration of the other AA communication unit UN-B which transmits and receives RF-B signals, is the same as that of the above-described AA communication unit UN-A. Accordingly, in FIG. 4, for the distinction between unit A and unit B, each element of the AA communication unit UN-B is denoted by the corresponding reference symbol of the above-described unit AA UN-A, only with A replaced by B.

Next, the signal transmission operation of the AA communication device having the above-described configuration will be described using the block diagram of FIG. 4 and the flowchart of FIG. 5. A description will be given of operation performed when sf-A and sf-B as multicarrier signals are transmitted to a mobile terminal from the antennas A1a to A1d and B1a to B1d of both RF-A and RF-B, respectively.

First, signals received by the antennas A1a to A1d at the AA communication unit UN-A side are converted into received digital signals inputted to the multipliers A5a to A5d of this unit. The received digital signals are also inputted to the receive weight vector calculator A4, the response vector calculator A7, and the RSSI meter A9 simultaneously.

The receive weight vector calculator A4 calculates a receive weight vector by the aforementioned calculation, using the received digital signals and the reference signal A3. Then, this receive weight vector is outputted to the multipliers A5a to A5d and also to the transmit weight vector calculator A8.

The multipliers A5a to A5d multiply the received digital signals by the receive weight vectors, and output results of the multiplications to the adder A6. The adder A6 adds these together, and outputs the resultant signal as a demodulated digital signal rf-A of a signal transmitted from the mobile terminal (step S1A).

The AA communication unit UN-A converts the digital transmit signal sf-A into RF-A signals and transmits the RF-A signals at transmit timing in the following manner. The response vector calculator A7 inputs the received digital signals received at receive timing and the demodulated digital signal, and calculates a receive response vector H1 by the aforementioned widely known computation (step S2A). Then, the transmit weight vector calculator A8 calculates a transmit weight vector W1 by the aforementioned widely known computation, using the receive weight vector calculated by the receive weight vector calculator A4 and the response vector H1 calculated by the response vector calculator A7. Moreover, the RSSI meter A9 measures the receive level RSSI of the received digital signals, receives the signal level RSSI of a signal rf-B from an RSSI meter B9 at the unit B UN-B side, and outputs these to the received power calculator A10 (step S3A).

The received power calculator A10 estimates the received power of the signal rf-A in accordance with computing equations of expression 1 below, using the transmit weight vector W1 calculated by the transmit weight vector calculator A8 and the receive level RSSI measured by the RSSI meter A9 (step S4A).

Simultaneously with the above-described steps S1A to S4A, at the AA communication unit UN-B side, for a signal sf-B transmitted from the receiving terminal, a demodulated digital signal rf-B is taken out (step S1B), a response vector H2 is calculated, a transmit weight vector W2 is calculated, and received power is estimated (steps S2B to S4B).

Then, the received power at the unit A UN-A side and that at the unit B UN-B side are compared (step S5). If the received power at the unit A UN-A side is larger, the amplitude of the transmit weight vector W1 is corrected at the transmit weight correctors A11 and B11 in accordance with expression 2 below. On the other hand, if the received power at the unit B UN-B side is larger, the amplitude of the transmit weight vector W2 is corrected at the transmit weight correctors A11 and B11 in accordance with expression 3 below.

The computation of the received powers in unit A UN-A and unit B UN-B is as follows:

Received Power of $f\_A = H1*W1 = (H11*W11 + H12*W12 + H13*W13 + H14*W14)$

Received Power of $f\_B = H2*W2*\alpha = (H21*W21 + H22*W22 + H23*W23 + H24*W24)*\alpha$ $$\alpha = 10^{((Signal\ f\_B's\ RSSI[dB] - Signal\ f\_A's\ RSSI[dB])/10)} \quad (1)$$

Here, Hx is a receive response vector, where x is a unit number taking a value of 1 for unit UN-A and 2 for unit UN-B. Further, Hxy is a receive response (complex number), where x is a unit number taking a value of 1 for unit UN-A and 2 for unit UN-B, and where y is an antenna number taking a value of 1 for a, 2 for b, 3 for c, and 4 for d, corresponding to each of the four antennas. Moreover, Wx is a transmit weight vector, where x is a unit number taking a value of 1 for unit UN-A and 2 for unit UN-B. Furthermore, Wxy is a transmit weight (complex number), where x is a unit number taking a value of 1 for unit UN-A and 2 for unit UN-B, and where y is an antenna number taking a value of 1 for a, 2 for b, 3 for c, and 4 for d, corresponding to each of the four antennas.

In the case where the received power at the unit A UN-A side is larger than that at the unit B UN-B side, the amplitudes of the transmit weights are corrected so that actual received powers match with the smaller one, by correcting the transmit weight vector W1 for the signal f-A at the unit A UN-A side without correcting the transmit weight vector W2 for the signal f-B at the unit B UN-B side in accordance with the following expressions 2 (step S6):

$$W1 = W1 * \frac{1}{\sqrt{f\_B\text{'sReceivedPower}/f\_A\text{'sReceivedPower}}}$$

$$W2 = W2 \qquad (2)$$

On the other hand, in the case where the received power at the unit B UN-B side is equal to or larger than that at the unit A UN-A side, the amplitudes of the transmit weight vectors are corrected so that actual received powers match with the smaller one, by correcting the transmit weight vector W2 for the signal f-B at the unit B UN-B side without correcting the transmit weight vector W1 for the signal f-A at the unit A UN-A side in accordance with the following expressions 3 (step S7):

$$W1 = W1$$

$$W2 = W2 * \frac{1}{\sqrt{f\_A\text{'sReceivedPower}/f\_B\text{'sReceivedPower}}} \qquad (3)$$

Then, transmit weights are assigned to the signals sf-A and sf-B to be transmitted, using the transmit weight vectors W1 and W2 corrected according to the received powers. Further, the transmit signals sf-A and sf-B are converted into RF signals, and the RF signals are transmitted from the antennas A1$a$ to A1$d$ and B1$a$ to B1$d$.

Thus, with the multicarrier communication device of this embodiment, when a wireless base station which performs multicarrier transmission in an adaptive array mode performs multicarrier transmission to one receiving terminal using a plurality of transmitting units, the receive levels of signals do not largely differ depending on wireless channels. Accordingly, stable signal reception becomes possible on a receiver having a multicarrier reception function.

Other Embodiments

Various modifications will become possible for those skilled in the art after receiving the teachings of the present disclosure without departing from the scope thereof.

It should be noted that though two-channel multicarrier communication has been described in the above-described embodiment, the present invention is not limited to this but can be applied to multicarrier communication of three or more channels similarly. For example, the case where received transmit powers need to be made equal among three radio signals RF-A, RF-B, and RF-C is described as follows.

Step S11: an AA reception process is performed on signal 1 (f1), signal 2 (f2), and signal 3 (f3) at unit A UN-A, unit B UN-B, and unit C UN-C, respectively.

Step S12: A response vector is calculated for each of unit A UN-A, unit B UN-B, and unit C UN-C.

Step S13: A transmit weight vector is calculated for each of unit A UN-A, unit B UN-B, and unit C UN-C.

Step S14: A received power is calculated for each of unit A UN-A, unit B UN-B, and unit C UN-C. Equations for calculating these received powers are given as expressions 4:

Received Power of Signal $1 = H1*W1 = (H11*W11 + H12*W12 + H13*W13 + H14*W14)$

Received Power of Signal $2 = H2*W2*\alpha 2 = (H21*W21 + H22*W22 + H23*W23 + H24*W24)*\alpha 2$ Received Power of Signal $3 = H3*W3*\alpha 3 = (H31*W31 + H32*W32 + H33*W33 + H34*W34)*\alpha 3$ $\alpha 2 = 10^{((\text{Signal 2's RSSI}[dB] - \text{Signal 1's RSSI}[dB])/10)}$ $\alpha 3 = 10^{((\text{Signal 3's RSSI}[dB] - \text{Signal 2's RSSI}[dB])/10)} \qquad (4)$ Step S15: The amplitudes of the transmit weight vectors are corrected. This correction is performed according to expressions 5:

The case where the received power of signal 1 is smallest:

$$W1 = W1$$

$$W2 = W2 * \frac{1}{\sqrt{\text{Signal1'sReceivedPower}/\text{Signal2'sReceivedPower}}}$$

$$W3 = W3 * \frac{1}{\sqrt{\text{Signal1'sReceivedPower}/\text{Signal3'sReceivedPower}}}$$

The case where the received power of signal 2 is smallest:

$$W1 = W1 * \frac{1}{\sqrt{\text{Signal2'sReceivedPower}/\text{Signal1'sReceivedPower}}}$$

$$W2 = W2$$

$$W3 = W3 * \frac{1}{\sqrt{\text{Signal2'sReceivedPower}/\text{Signal3'sReceivedPower}}}$$

The case where the received power of signal 3 is smallest:

$$W1 = W1 * \frac{1}{\sqrt{\text{Signal3'sReceivedPower}/\text{Signal1'sReceivedPower}}}$$

$$W2 = W2 * \frac{1}{\sqrt{\text{Signal3'sReceivedPower}/\text{Signal2'sReceivedPower}}}$$

$$W3 = W3$$

That is, an increase in the number of the wireless carrier RFs can be coped with by increasing the process of the above-described steps S11 to S13 depending on the number of the RFs. Further, in the process of the above-described step S14, comparisons are made with reference to a certain channel. Since this channel is a comparison reference, it may be any channel. Moreover, in the process of the above-described step S15, matching to the channel having a minimum received power is performed. It should be noted that the configuration of a communication unit of each channel is equally the same as that shown in FIG. 4.

Figure 3:
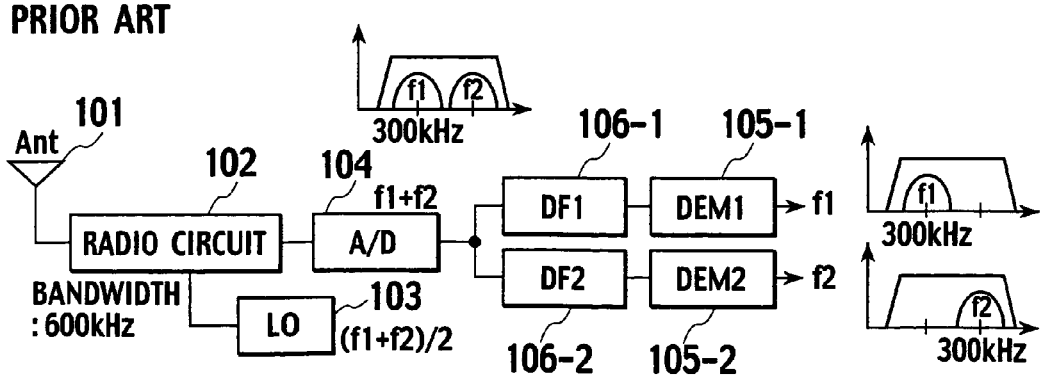
FIG. 3 is a block diagram of a proposed multicarrier receiver which can perform multicarrier processing.

Furthermore, though a base station of an adaptive array communication system has been described in this embodiment, a base station which transmits signals to a receiver having the configuration shown in FIG. 3 which corresponds to multicarrier reception may have a simpler configuration in which Omni transmission is performed. In the case of a wireless communication device which performs Omni transmission, response vectors and transmit weight vectors are not calculated, and the transmit powers of RF-A and RF-B are adjusted by performing the process of step S4 and the following steps in the flowchart of FIG. 5 with the aforementioned transmit weight vectors Wx and receive response vectors Hx fixed to W1=W2=H1=H2=(1,0). Ultimately, the magnitudes of transmit weights are determined according to a scaling factor (power ratio) of $\alpha$.

What is claimed is:

1. A wireless communication method using a wireless communication device having a plurality of communication units, the wireless communication method comprising:
   receiving, at each communication unit, a signal transmitted from a receiving terminal;
   measuring, for each communication unit, a receive level of the signal transmitted from the receiving terminal;
   calculating, for each communication unit, a transmit weight vector based on received signals corresponding to the signal transmitted from the receiving terminal;
   calculating, for each communication unit, a received power based on a measured value of the receive level and the transmit weight vector;
   comparing the received powers calculated for at least two of the communication units, and, to match the received powers to the received power corresponding to a communication unit having a lowest received power, making a downward correction of an amplitude of the transmit weight vector for each of the other communication units; and transmitting a signal using the transmit weight vector after the connection by each communication unit.

2. A wireless communication device having a plurality of adaptive array communication units, each adaptive array communication unit comprising:

a receive level meter configured to measure a receive level of received signals corresponding to a signal transmitted from a receiving terminal;

a transmit weight vector calculator configured to calculate a transmit weight vector based on the received signals corresponding to the signal transmitted from the receiving terminal;

a received power calculator configured to estimate a received power of the relevant unit based on a value of the receive level measured by the receive level meter and based on the transmit weight vector from the transmit weight vector calculator; and a transmit weight corrector configured to compare the received power of the relevant unit, which is estimated by the received power calculator, with the received power estimated by another adaptive array communication unit, and if the received power of the relevant unit is higher, making a downward correction of an amplitude of the transmit weight vector so that the received power of the relevant unit matches with the received power of the unit having a lower received power.

3. A wireless communication device having a plurality of communication units, each communication unit comprising:

a receive level meter configured to measure a receive level of received signals corresponding to a signal transmitted from a receiving terminal;

a transmit weight vector calculator configured to calculate a transmit weight vector based on the received signals corresponding to the signal transmitted from the receiving terminal;

a received power calculator configured to estimate a received power of the relevant unit based on a value of the receive level measured by the receive level meter and based on the transmit weight vector from the transmit weight vector calculator; and a transmit weight corrector configured to compare the received power of the relevant unit, which is estimated by the received power calculator, with the received power estimated by another communication unit, and if the received power of the relevant unit is higher, making a downward correction of an amplitude of the transmit weight vector so that the received power of the relevant unit matches with the received power of the unit having a lower received power.

4. A wireless communication method for a wireless communication device, comprising the steps of:

transmitting, from a first adaptive array communication unit of the wireless communication device to a receiver terminal, a first signal using a first carrier in accordance with a first transmit weight;

transmitting, from a second adaptive array communication unit of the wireless communication device to a receiver terminal, a second signal using a second carrier in accordance with a second transmit weight;

measuring, at the wireless communication device, a first receive level of a first received signal received from the receiver terminal and a second receive level of a second received signal received from the receiver terminal;

calculating, at the wireless communication device, a first received response vector corresponding to the first adaptive array communication unit on the basis of the first received signal;

calculating, at the wireless communication device, a second received response vector corresponding to the second adaptive array communication unit on the basis of the second received signal;

calculating, at the wireless communication device, a first estimation received power of the first signal received at the receiving terminal, on the basis of the first transmit weight, the first received response vector and the first receive level;

calculating, at the wireless communication device, a second estimation received power of the second signal received at the receiving terminal, on the basis of the second transmit weight, the second received response vector and the second receive level;

comparing the first estimation received power with the second estimation received power;

performing a downward correction to an amplitude of the first transmit weight in a case where the first estimation received power is higher than the second estimation received power; and performing a downward correction to an amplitude of the second transmit weight in a case where the second estimation received power is higher than the first estimation received power.

5. The wireless communication method according to claim 4 wherein in the estimating step, calculating a multiplication result of the first transmit weight vector and the first received response vector as a first estimation received power, and calculating a multiplication result of a value on the basis of a difference between the second transmit weight vector and the second received response vector and the first receive level and the second receive level, as the second estimation received power.

6. The wireless communication method according to claim 4, wherein a frequency of the first carrier and a frequency of the second carrier are adjacent to each other.

7. The wireless communication method according to claim 5, wherein a frequency of the first carrier and a frequency of the second carrier are adjacent to each other.

* * * * *